TERMINATION FOR COMBINED BIT AND SENSE WINDINGS

Filed Dec. 31, 1962 3 Sheets-Sheet 1

INVENTORS
WILBUR D. PRICER
NORBERT G. VOGL, JR.
BY J. Jancin Jr.
ATTORNEY

TERMINATION FOR COMBINED BIT AND SENSE WINDINGS

Filed Dec. 31, 1962 3 Sheets-Sheet 2

Dec. 20, 1966 W. D. PRICER ETAL 3,293,622

TERMINATION FOR COMBINED BIT AND SENSE WINDINGS

Filed Dec. 31, 1962 3 Sheets-Sheet 3

United States Patent Office 3,293,622

Patented Dec. 20, 1966

3,293,622

TERMINATION FOR COMBINED BIT AND SENSE WINDINGS

Wilbur D. Pricer, Wappingers Falls, and Norbert G. Vogl, Jr., Albany, N.Y., assignors to International Business Machines Corporation, New York, N.Y., a corporation of New York Filed Dec. 31, 1962, Ser. No. 248,584

15 Claims. (Cl. 340—174)

The invention relates to data storage systems and more particularly to common-information-control and information-sensing means for such systems.

Data storage systems are well known in the data processing art. Such systems may employ magnetic memory elements such as magnetic cores or thin films as the medium in which individual bits of information are stored. Access to individual memory elements is usually accomplished by arranging the elements in coordinate arrays of 2 or 3 dimensions, and providing excitation windings for each coordinate dimension. Individual storage elements are selected for information storage or for interrogation of information previously stored by energizing windings corresponding to the coordinates of the storage elements.

In a two dimensional memory array the storage elements are arranged in a matrix of row and column coordinates. The windings for the columns may be used to control the binary value, 0 or 1, stored in the array. The row windings (word-lines) may be used to select the word location within which the binary values are to be stored. A word would be comprised of a number of storage elements, each element corresponding to one bit (the bit having either a 0 or 1 binary value) of the word. Read-out of information may then be accomplished by energizing the word-line only. Ordinarily, a separate winding is provided for each column on which a sense signal is generated by the storage elements in which a one was stored.

Three dimensional systems differ from two dimensional systems in that three dimensional systems utilize a number of matrix or planar arrays stacked, for example, one above another. X and Y coordinate lines corresponding to rows and columns in a plane are energized to select one memory element in each plane. Corresponding X and Y lines of each plane are connected together so that corresponding locations in each plane are simultaneously selected upon energization of particular X and Y lines. Thus, on energizing an X line and a Y line, a core at their intersection will be selected in each plane. The cores so selected will be in vertical line, one in each plane, one above another. The cores so selected represent a word location, each bit position of which is represented by one core in each plane. A third winding (information-control or inhibit winding) is provided to control the binary value, 0 or 1, stored in each bit position of the word selected. This third winding laces all the cores of a plane and is energized in a manner which will inhibit the switching of all the cores in the plane and hence the switching of the core selected by the X and Y windings. Thus if a zero is to be written in the bit position corresponding to the first plane, the information-control winding lacing cores in that plane would be energized, inhibiting the switching of the core selected in the first plane. All other cores selected by the X and Y coordinates would be switched to a one state. 0 or 1 bits are controlled in each plane in a similar manner as that described for the first plane.

Interrogation or read-out of information is accomplished by selecting the X and Y coordinates of the word to be read. All cores in a vertical line, one in each plane, will be selected. Any cores previously set to a one state will switch. Ordinarily a fourth winding (information-sense winding) is provided lacing all cores of a plane (the same way the information-control winding laced all cores in a plane). When a core switches from a 1 to 0 state, a pulse is produced on the information-sense winding.

In the two dimensional memory system previously described, energization of a row winding selects a word storage location. Energization or disenergization of each column winding determines whether a 1 or 0 bit is to be written into a corresponding bit position of the word in the row selected. The column windings may therefore conveniently be referred to as "information-control" windings because they control the binary value, 1 or 0, which is to be written.

Similarly, the inhibit windings of the three dimensional array described may be referred to as "information-control" windings because it is energization or disenergization of these windings which controls the binary value, 0 or 1, which is to be written into a particular bit position of the memory. Throughout this specification the term "information-control winding" will be used to identify the windings which when energized or not determine the binary value stored.

It has been recognized by the prior art that since in both two dimensional and three dimensional memories the information-control and the information-sense windings are never used concurrently, they may be advantageously combined. Combining two windings reduces the cost of fabrication and simplifies the manufacturing process. The decrease in the number of windings permits the use of smaller toroidal cores in core memory systems, and closer and more effective coupling between thin-film elements and the windings in thin-film systems.

The prior art has also recognized that common information-control and information-sense windings have transmission-line characteristics. The prior art has therefore found it desirable to terminate the common winding in an impedance equaling the characteristic impedance of the winding in order to minimize adverse effects from reflections, etc., which occur on transmission lines which are not properly terminated.

It has further been found by the prior art, that noise cancellation and enhanced signal-to-noise discrimination may be obtained by splitting up the common-information-control/information-sense line so that half of the cores are laced by a first line and the remaining half of the cores are laced by a second line. Both lines are then energized in parallel (common-mode) for information-control purposes. During information-sensing only one core will be switched, hence, a signal will appear on only one of the two lines, thus causing energization of both lines effectively in series, because the lines are physically connected together at the driver end for the aforementioned parallel operation. This series energization is referred to as "difference-mode." While this arrangement is used in the prior art to advantage in eliminating noise, it does have serious problems, which will now be considered.

It was mentioned earlier that it is desirable to terminate the common-information-control/sense winding in its characteristic impedance. However, when the winding is energized for purposes of information-control (that is, in parallel) the winding has one characteristic impedance value. When the winding is energized for purposes of information-sensing (in series) the winding has a second and different value. This is because the windings in a core memory are physically placed very close together. This problem has caused previous methods of combining the information-control and sense windings to experience difficulty with reflections and ringing caused by improper termination of the line.

3,293,622

3 4

It is, therefore, a paramount object of this invention to provide a terminal circuit for properly terminating a common information-control and information-sense winding.

It is also an object of this invention to provide a novel network for combining information-control and sense windings which does not suffer from excessive ringing when pulsed by an information-control driving circuit.

A further problem experienced in the prior art is that of assuring effective isolation between the information-control and information-sensing circuitry connected to the common winding without impairing the efficiency of the system for either purpose.

It is, therefore, an object of this invention to provide a terminal circuit which provides effective isolation between the information-control and information-sensing circuit without impairing the efficiency of the system for either operation.

The above objects are accomplished by a dual purpose circuit element in a terminal circuit connected to the common information-control/information-sense line. The dual purpose circuit element is responsive to information-control signals (common-mode) for connecting a common-mode impedance to the line; and is responsive to information-sense signals (difference-mode) for connecting a difference mode impedance to the line.

The invention has the advantage that both the information-control and the sense signals are properly terminated. The terminations are independent and may be adjusted to properly match the transmission-line characteristic impedance of the winding for each signal.

A further advantage of the invention is that both the information-control and the sense terminations are broadband, thus providing proper matching for all signals, harmonics and sub-harmonics included. The use of transmission-line transformers also permits the signals to be transmitted with virtually no attenuation or distortion.

The basic invention is adaptable to thin-film memory matrices or magnetic-core-memory arrays employing either one or two cores-per-bit; full or partial switching modes; and the sensing of either voltage or current.

The foregoing and other objects, features, and advantages of the invention will be apparent from the following more particular description of preferred embodiments of the invention, as illustrated in the accompanying drawings.

In the drawings:

FIG. 1 is a simplified schematic diagram of a magnetic-core memory in which the invention may be embodied;

FIGS. 2*a* and 2*b* are schematic diagrams of long transmission lines used to illustrate the problem of terminating such lines;

FIGS. 3*a* and 3*b* are schematic diagrams illustrating a bifilar transformer, which is a circuit element used to illustrate the embodiments of the invention shown;

A clear understanding of the invention may best be had by first considering the scope of the problem to be solved. The problem with which the invention is concerned is that of terminating a common information-control and information-sense winding in a magnetic memory system. Since it has been found that common information-control and information-sense windings have transmission-line characteristics, a comparison between a magnetic-core-memory array illustrated by FIG. 1 and a long transmission line illustrated by FIGS. 2*a* and 2*b* will first be considered.

Figure 1:
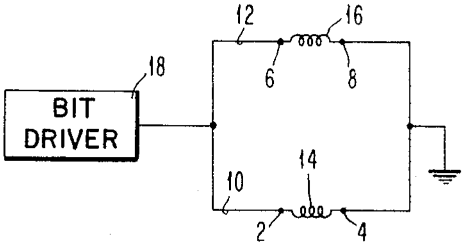

FIG. 1 illustrates a simplified magnetic-core-memory array, in which the individual cores are not shown, nor are all coordinate windings which are necessary to operate the array. Only the common information-control and information-sense winding, 10, 12, is shown in FIG. 1. The magnetic cores through which the common winding is threaded are represented by the inductive elements, 14, 16. When information is written into the array, individual cores are selected by energizing the coordinate windings (not shown) and the bit driver 18. The signals produced on the common winding 10, 12, will be referred to throughout the specification as "common-mode signals" because both lines 10 and 12 are driven in common. When a core is sensed by proper selection of the coordinate windings (not shown) a current will be developed in the common-information-control sense winding. This current may be considered as a voltage across one of the inductive elements 14 or 16 which in FIG. 1 represent the windings on cores of the matrix. The signals so produced will be referred to as "difference-mode signals" throughout the specification.

Figure 2A:
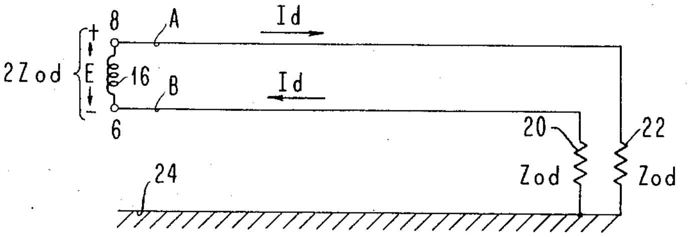

In FIG. 2*a* the common-information-control/sense winding 10, 12 of FIG. 1 is represented by two parallel transmission lines, A and B, to illustrate the behavior of the winding during sensing.

The terminals 6 and 8 of the inductor 16 in FIG. 1 are shown as the terminals 6 and 8 in FIG. 2*a*. The bit driver of FIG. 1 is not shown in FIG. 2*b* as it is effectively an open circuit during sensing. Since no voltage is generated at inductor 14 and it has a negligible effect in the circuit it need not be shown in FIG. 2*a*. The parallel lines A and B of FIG. 2*a* are shown terminated in their characteristic impedances for difference-mode ($Zod$) represented by the resistors 20 and 22. The resistors 20 and 22 are returned to the ground plane 24.

Suppose for example, a core in the array of FIG. 2*a* is sensed, producing a difference-mode voltage E across the representative inductor 16. Since the resistors 20 and 22 are equal and the circuit is balanced, the voltage E impressed across lines A and B may be considered at point 8 as a positive voltage of value E/2 and at point 6 as a negative voltage of value E/2. The characteristic impedance *between* the two lines A and B may therefore be considered to be 2 $Zod$. Current will flow on the lines as indicated by the arrows labeled $Id$.

Figure 2B:
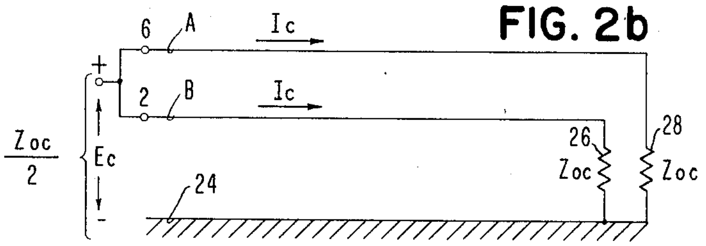

The common-mode situation is illustrated by FIG. 2*b*. When writing information into the array the lines 10 and 12 of FIG. 1 are driven in common by the bit driver 18. A voltage E, shown in FIG. 2*b* is therefore shown from ground to the points 2 and 6 tied in common. The lines A and B are shown terminated in their characteristic impedances for common-mode signals ($Zoc$) 26, 28. Upon energization of the bit driver (not shown in FIG. 2*b*) a voltage $Ec$ is impressed on the lines and a current $Ic$ flows in each line as shown by the arrows. The impedance between the common point 2, 6, and ground measures $Zoc/2$.

If the lines A and B are physically far apart from each other as compared to their distance from the ground plane 24, the characteristic impedance of the lines will be the same whether the lines are energized in common-mode or in difference-mode. However, if the lines A and B are close together with respect to each other as compared to their distance from the ground plane, then the characteristic impedance of the line will be one value when the line is energized in common-mode and another value when the line is energized in difference-mode. Therefore, since the windings in a magnetic-core-memory array are very close together, different terminations are necessary for common-mode and difference-mode signals if the line is to be properly terminated in each mode. The present invention provides a terminal circuit that distinguishes between common- and difference-mode and provides an independent termination in either mode.

Figure 3A:
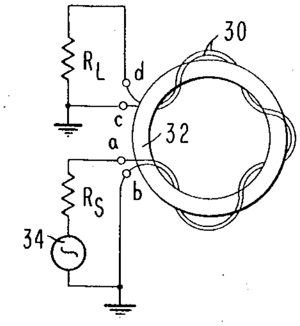

The basic element of the embodiments herein disclosed is a transmission-line transformer illustrated in FIGS. 3*a* and *b*. A transmission-line transformer is essentially a bifilar transformer in which winding spacing is carefully controlled such that the two windings together may be considered to be a transmission line of fixed impedance independent of the magnetic material (see "Some Broad-Band Transformers," proceedings of the IRE, August 1959 by C. L. Ruthroth, pages 1337–1342).

A brief general explanation of how these transformers operate will precede the description of how they may be utilized to practice the invention.

Figure 3B:
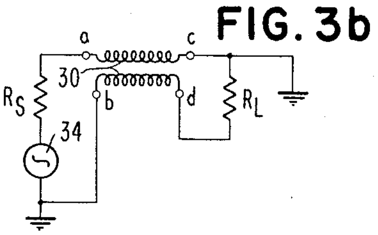

The transformer shown in FIG. 3*a* consists of a single bifilar winding 30 wound on a magnetic core 32. The winding 30 is terminated at one end in a resistor RL and is driven at the other end by a voltage source 34 whose internal resistance is the resistor RS. The circuit of FIG. 3*a* is shown in transmission line form in the schematic diagram of FIG. 3*b*. This circuit is described in the aforementioned IRE article. Either end of the resistor RL may be grounded depending on the output polarity desired. When grounded as shown in FIG. 3*a*, and FIG. 3*b*, the polarity is reversed. If a positive signal is impressed across *a–b*, a negative signal results at *c–d*. If the other end of resistor RL had been grounded, a positive signal would have resulted at *c–d*. At high frequencies, the circuit can be considered as an ideal transformer, plus a length of transmission line. In the descriptions that follow both the transforming properties and the transmission line properties of the transmission-line transformers must be kept in mind.

Figure 4:
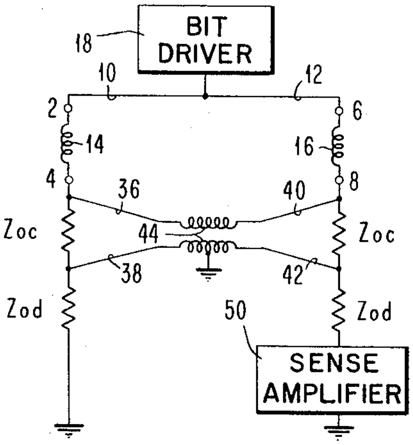
FIG. 4 is a schematic diagram of a first embodiment of the invention wherein current sensing may be used.

A first embodiment of the invention is shown in FIG. 4. A bit driver circuit 18 is connected to drive two parallel lines 10, 12 which correspond to the common-information-control/sense winding. Inductors 14, 16 represent the windings on the cores in a core array. The coordinate windings for selecting particular cores are not shown, for simplicity; but the array may be either of the two-dimensional type or three-dimensional type which are well known in the prior art.

Resistors *Zoc* are matched to the lines 10 and 12 to properly terminate common-mode signals, and resistors *Zod* are matched to the lines 10 and 12 to properly terminate difference-mode signals. One resistor *Zoc* and one resistor *Zod* are connected in series with line 10 and returned to ground. A similar arrangement is shown for line 12. A transmission-line transformer 44, having a pair of input terminals 36, 38 and a pair of output terminals 40, 42 is connected so that the input bridges one resistor *Zoc* and the output bridges the other resistor *Zoc*. It should be understood that the transformer 44 is bi-directional and the reference to "input" and "output" terminals is for purposes of identification only; the left hand terminals arbitrarily chosen as the "input." The winding associated with terminals 38, 42 is provided with a center-tap which is grounded.

The bit-driver 18 is energized in the common-mode thereby producing equal voltages on the common-information-control/sense line 10, 12. Equal voltages are therefore produced at the terminals 36 and 40 of the transmission-line transformer 44. Thus positive waves propagate in both directions down the line. In the time equal to one electrical length of the line, terminals 36, 38 and 40, 42 both see a wave equal to the wave which was imparted to the line one electrical length earlier in time. This is the condition for an open circuit. Therefore, the transformer 44 behaves as an open circuit to common-mode signals. Hence all common-mode signals must flow through the two resistors marked *Zoc*. The common-mode signals are returned to ground through the bottom half of the transformer 44, the center-tap of which is grounded.

When one of the cores is sensed a voltage will appear across one of the inductive elements 14, 16 which represent the windings of the cores of the matrix. This is a difference signal and will initiate equal but opposite waves on the transmission line 44 at the terminals 36 and 40. This is the condition for a short circuit at either end of the line. Thus, 36 shorts to 38 and 40 shorts to 42, and difference-mode signals are short circuited around the two resistors marked *Zoc*. Therefore, all difference-mode signals must pass through the resistors marked *Zod* to ground. On the right-hand side of the diagram a sense amplifier 50 is placed in series with one of the difference-mode terminating resistors *Zod*. It has been found experimentally that by lowering the *Zod* on one side and raising the *Zod* on the other side, one of the terminating resistors *Zod* may be made infinite and the other replaced by a *Zod*/2 resistor in series with a sense amplifier on only one side. The circuit operates satisfactorily and has the advantage of increased current through the sense amplifier.

Another change which may be made to the circuit in FIG. 4 is to reverse the connections 40 and 42 or 38 and 36. Having done this, an inversion takes place in the circuit and *difference-mode* signals are now presented with an open circuit across 36, 38, and 40, 42 to thereby terminate difference-mode signals in *Zoc*. Common-mode signals are presented with a short circuit across 36, 38, and 40, 42 and are terminated in *Zod*. Other variations are readily apparent—for example, the sense amplifier 50 may be placed in series with one of the impedances *Zoc*, to sense the current passing therethrough.

Figure 5:
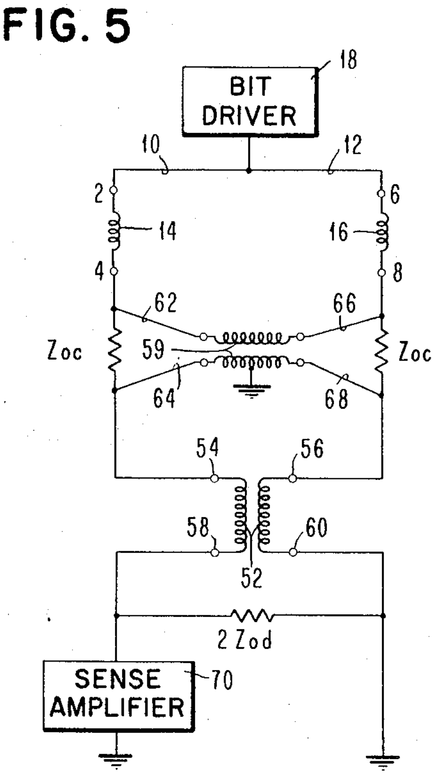
FIG. 5 is a schematic diagram of a second embodiment of the invention similar to the first embodiment, wherein voltage sensing may be used.

The circuit shown in FIG. 5 is a modification of the circuit shown in FIG. 4. In order to provide a balanced-to-unbalanced transformation for difference-mode signals, a second transmission-line transformer 52 is used as a balun. The output terminals 58, 60 are bridged by a terminating resistor *Zod*. The input terminals 54, 56 and connected across the terminals 64, 68 associated with one of the windings of transformer 59. Either end of 2 *Zod* may be grounded and a sense amplifier 70 connected to sense voltage at the ungrounded end. The operation is as follows. Common-mode signals are presented with an open circuit by the transformer 59. Therefore, common-mode signals are terminated by the resistors *Zoc* to the ground return of the center tap of transformer 59. However, difference-mode signals are presented with a short circuit by the transformer 59 and therefore are shorted around the resistors *Zoc* through the coils of transformer 52 to the impedance 2 *Zod* at the output end of the transmission-line transformer 52. Either end of 2 *Zod* may be grounded and the voltage developed across 2 *Zod* may be sensed on the ungrounded end of that resistor. The reason why the terminating resistor must have a value of 2 *Zod* was explained previously with reference to FIG. 2*a* where it was shown that the impedance between two lines energized in difference-mode is 2 *Zod*.

Figure 6:
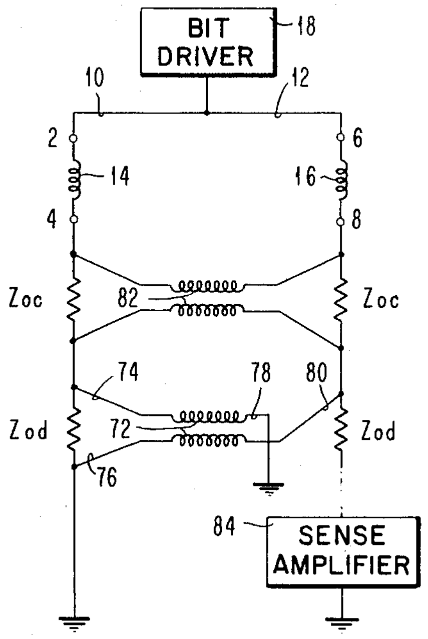
FIG. 6 is a schematic diagram of a third embodiment which is an improvement over the embodiment of FIG. 4.

A third embodiment of the invention is shown in FIG. 6. Here a second transformer 72 is connected so that its input terminals 74, 76 bridge one resistor *Zod* while its output terminals 78, 80 in a reverse sense, bridge the other resistor *Zod*.

The use of a second transformer 72 eliminates the need for a ground return on the center-tap of transformer 44 of FIG. 4. An inversion is however necessary in the lower transformer 72 in order that the action of the lower transformer will be opposite to the action of the upper transformer 82. The operation of the circuit is as follows. Common-mode signals pass through the resistors *Zoc* because the transformer 82 presents an open cricuit to the signals as previously described in reference to FIG. 4. There is no ground return on the center-tap of transformer 82, therefore, the common-mode signals are not returned to ground at that point as they were in the circuit of FIG. 4. The common-mode signal therefore appears at the lower transformer 72. Since there is an inversion on the right-hand side of transformer 72, the transmission line presents a short circuit to the common-mode signals, which are therefore shunted around the resistors *Zod* to ground.

Difference-mode signals, however, are presented with a short circuit by upper transformer 82 as described in reference to FIG. 4. However, these difference-mode signals are presented with an open circuit by the transformer 72 again because of the inversion, and therefore difference-mode signals pass through the resistors *Zoc* to ground. A sense amplifier 84 placed in series with the right-hand *Zod* will sense difference-mode signals. It should be also noted, as was noted in the description of the circuit of FIG. 4, that one of the resistors *Zod* could be made infinite and the other resistor *Zod* replaced by a resistor *Zod*/2 in series with a sense amplifier. It has been found experimentally that this circuit configuration will operate satisfactorily.

Figure 7:
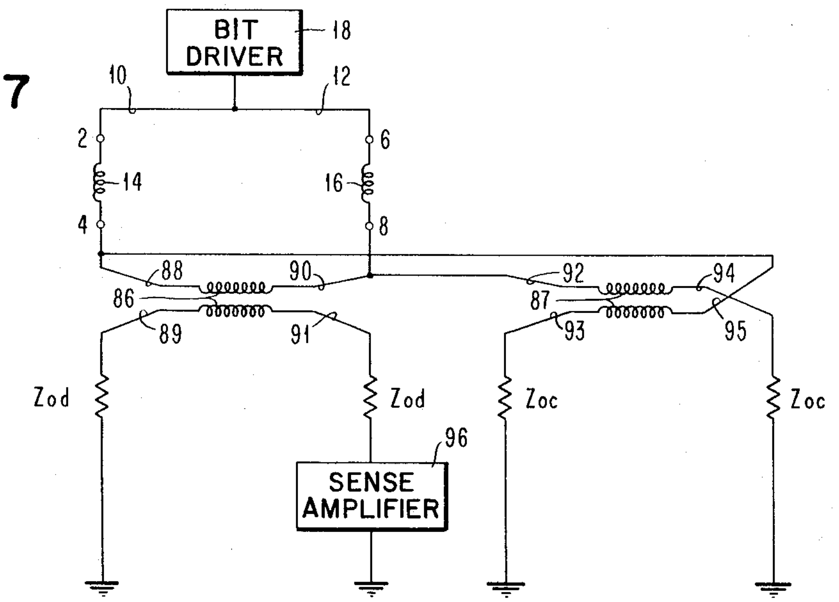
FIG. 7 is a schematic diagram of a fourth embodiment of the invention wherein the transformers are connected in parallel with respect to each other.

In the embodiment of FIG. 7, transformers 86, 87 are connected to the lines 10, 12 in a parallel manner. Transformer 86 has one input terminal 88 connected to line 10, and one output terminal 90 connected to line 12. A similar arrangement is provided for transformer 87 but an inversion is provided so that while input terminal 92 is connected to line 12, the opposite-in-sense output terminal 95 is connected to line 10. The terminating resistors *Zod* are connected to the remaining input terminal 89 and output terminal 91. The resistors *Zoc* are likewise connected to input terminal 93 and output terminal 94 of transformer 87.

The operation of the circuit of FIG. 7 is as follows. Common-mode signals will be presented with an open circuit by the transformer 86 but will be presented with a short circuit across the input and output terminals of transformer 87. Therefore common-mode signals are shorted around the transformer 87 through the terminating resistances *Zoc* to ground.

Difference-mode signals, however, are presented with a short circuit by the transformer 86 and an open circuit by the transformer 87. Therefore difference-mode signals are shorted around the transformer 86 through the terminating resistances *Zod* to ground. A sense amplifier 96 placed in series with one of the terminating resistances senses the current flow caused by the difference-mode signal.

Figure 8:
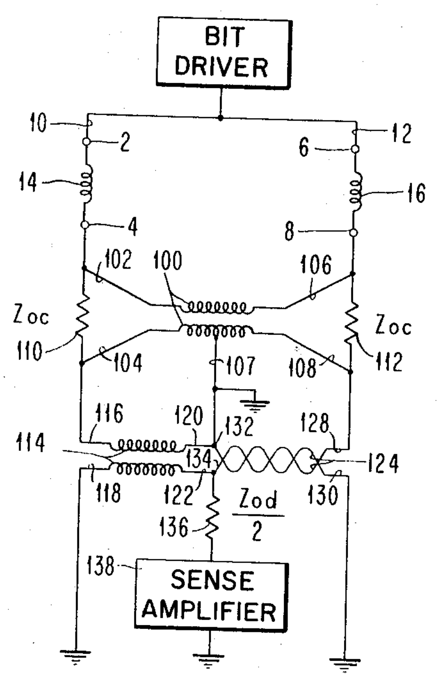
FIG. 8 is a schematic diagram of a fifth and preferred embodiment of the invention wherein maximum current is obtained through the sense amplifier by combining the difference-mode resistors.

A preferred embodiment of the invention is shown in FIG. 8. The circuit of FIG. 8 is similar to the circuit of FIG. 6. It was pointed out in reference to FIG. 6 that the *Zod* terminating resistors could be combined on one side giving *Zod*/2. This would increase the current through the sense amplifier and hence the sensitivity of the sense amplifier. The circuit of FIG. 8 incorporates this and other modifications which eliminate some of the disadvantages of making the changes suggested in reference to the circuit of FIG. 6.

A first transmission-line transformer 100 is shown having input terminals 102, 104, and output terminals 106, 108. The input terminal 102 is connected to one of the parallel lines 10, and the output terminal 106 is connected to the other parallel line 12. A first common-mode impedance 110 is connected so that it bridges the input terminals 102, 104 and a second common-mode impedance 112 is connected so that it bridges the output terminals 106, 108. A centertap is provided on the windings associated with terminals 104 and 108 so that the winding may be grounded. A second transmission-line transformer 114 is provided having input terminals 116, 118 and output terminals 120, 122. The input terminals 116 of transformer 114 is connected to the input terminal 104 of transformer 100, and the input terminal 118 of transformer 114 is grounded. A delay circuit 124, is provided having input terminals 128, 130 and output terminals 132, 134. The input terminal 128 is connected to the output terminal 108 of transformer 100, and the input terminal 130 is grounded. The output terminals of delay line 124 are connected to the output of transformer 114. The difference-mode terminating register 136 (*Zod*/2) is connected to the junction of transformer 114 and delay line 124. Sense amplifier 138 is connected in series with the terminating resistor 136 and returned to ground.

The circuit of FIG. 8 operates in a similar manner to the circuit of FIG. 6. The transformer 100 presents an open circuit to common-mode signals; therefore common-mode signals are terminated in the common-mode impedances *Zoc* and are returned to ground through the center tap 107. Difference-mode signals, however, are presented with a short circuit by the transformer 100 and, therefore, difference-mode signals appear at the input 116 of transformer 114 and the input 128 of delay line 124. The delay of 124 is equal to the delay of the transformer 114, in order to eliminate transients that would occur at the junction of the delay line and transformer 114 if signals reached the junction at noncoincident times. The signal at the input of transformer 114 is inverted when it reaches the output of transformer 114, so that the transformer 114 will operate as an open circuit to difference-mode signals. Therefore, difference-mode signals pass through the impedance 136 and through the sense amplifier 138.

The circuit of FIG. 8 eliminates some of the disadvantages of making the changes suggested in the description of FIG. 6. The grounding of the points, 107 and 132, which theoretically should be at ground potential even without grounding, eliminates the necessity for perfectly matched transformers and reduces the possibility of obtaining reflections. The delay circuit 124 which may be a simple twisted pair of wires, is added to delay the signal through delay 124 by the same amount that the signal is delayed by transformer 114, so that the signals will reach the junction point of the delay circuit 124 and the transformer 114 at approximately the same time. This eliminates transients that might occur at the sense point 134 resulting from different path lengths for the difference-mode signals, and also prevents common-mode signals from arriving at transformer 114 at noncoincident times, which would appear as a difference-mode signal.

Figure 9:
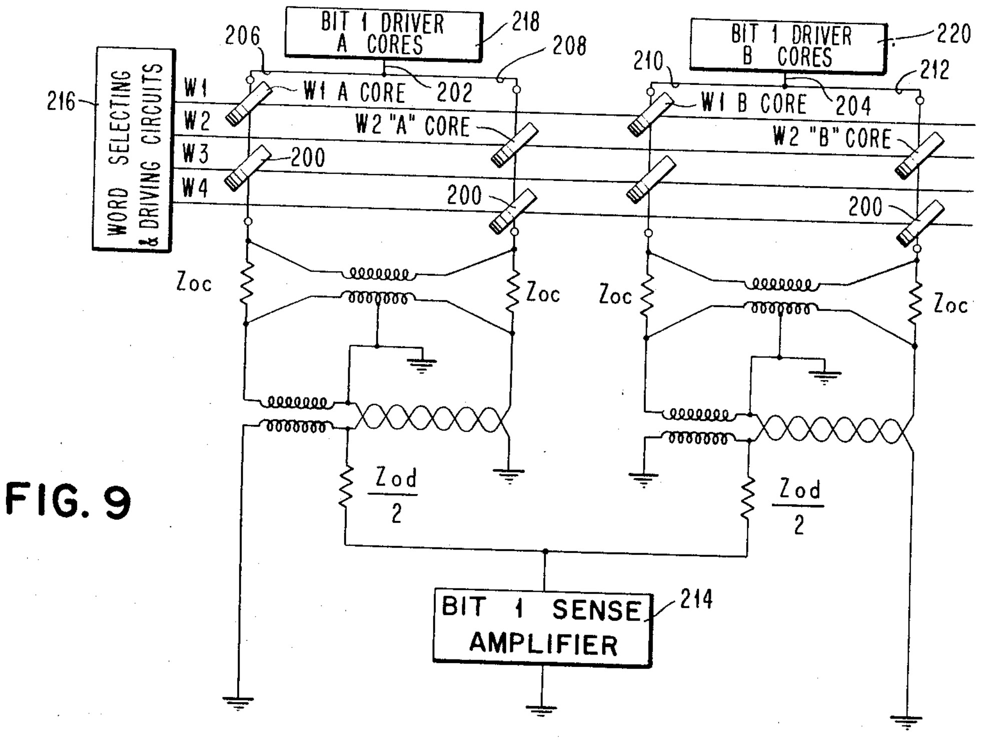
FIG. 9 is a schematic diagram of a two-core-per-bit memory system in which the invention is embodied.

FIG. 9 shows a two-core-per-bit array embodying the invention. (A memory system of this type is described in detail in the IBM Journal of Research and Development, vol. 5, No. 3, July 1961, pages 174–182.) A two-core-per-bit memory system utilizes two magnetic-memory cores for each data bit storage cell. The system comprises a coordinate array of cores 200 functionally arranged in rows and columns, each row W1, W2, etc., representing a different word storage register, and each pair of lines 202, 204 representing a different bit-storage position common to all word registers. (Note the staggered relationship of cores 200.) The two cores common to a given row in a given pair of columns form a bit-storage register, and the cores are referred to as the A core and the B core. Only bit position 1 is shown but there normally would be as many duplicate bit-driver circuits as there are bit positions in the word format.

An A core common-information-control/sense winding 206, 208 threads the A cores and is terminated in an A core terminal circuit similar to the terminal circuit of FIG. 8. B core common-information-control/sense winding 210, 212 threads the B cores and is terminated in a B core terminal circuit. The difference-mode terminating resistors *Zod*/2 of each terminal circuit are connected together and returned through a common bit 1 sense amplifier 214.

The A and B cores are initially placed in identical magnetic states, for example, the negative limiting state of remanent magnetism. Binary information is stored in the cores by switching one or both cores from the initial state toward the opposite limiting state of remanent magnetism, making sure that one of the two cores is switched farther than the other, so that their final information representing states contrast.

For example, suppose a binary "one" is to be stored in bit position 1 of word register W1. Word-line W1 would be energized by word selecting and driving circuit 216. Bit 1 driver 218 would then be energized. The current through the driver is set so that the A core will be switched farther than the B core. In a binary 0 were to be stored the B core would be switched farther than the A core, by energizing bit driver 204.

To read the stored information, the word-line W1 would be energized in such a direction as to switch both the A core and the B core to their initial magnetic states (i.e., the negative limiting state of remanent magnetism as previously chosen for purposes of example). The voltages induced by each core would differ because one core was switched farther than the other. These voltages are responded to by the A and B terminal circuits in the same manner as described with reference to FIG. 8. Since the terminating resistors $Zod/2$ of each terminal circuit are tied in common and connected to a common sense amplifier 214, only the net difference signal of the signals produced by switching cores A and B is sensed by the sense amplifier. The polarity of this signal is an indication as to whether the information stored was a one bit or a zero bit.

It should be realized that while the circuit of FIG. 9 utilizes the circuit of FIG. 8 as a subcombination, any of the various forms of the subcombination embodiments disclosed in FIGS. 4 through 8 may be substituted therefore and still be within the scope of the invention.

In summary, the invention described herein provides for the direct combination of information-control lines and information-sense lines in magnetic memories employing either two-cores-per-bit or more conventional memory array techniques. The invention provides proper terminations for both the information-control and the information-sense modes of operation of this dual purpose line.

In addition, the invention provides isolation between the information-control driving circuits and the information-sense amplifiers, thus preventing overload of these amplifiers.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In combination with two parallel lines which may be energized in common- or difference-mode to produce either common-mode signals or difference-mode signals on said lines, a terminal circuit comprising:
- means for terminating the parallel lines for at least one of said mode of signals;
- dual purpose means connected to said parallel lines and responsive to energization in each of said modes for establishing between said parallel lines and said terminating means, a connecting circuit in response to energization by one of said mode of signals and an open circuit in response to energization by the other of said mode of signals.

2. In combination with two parallel lines which may be energized in common- or difference-mode to produce either common-mode signals or difference-mode signals on said lines, a terminal circuit comprising:
- means for terminating the parallel lines for at least one of said mode of signals, wherein said means for terminating the parallel lines for at least one of said mode of signals includes means for sensing said signals;
- dual purpose means connected to said parallel lines and responsive to energization in each of said modes for establishing between said parallel lines and said terminating means, a connecting circuit in response to energization by one of said mode of signals and an open circuit in response to energization by the other of said mode of signals.

3. In combination with two parallel lines which may be energized in common- or difference-mode to produce either common-mode signals or difference-mode signals on said lines, a terminal circuit comprising:
- means for terminating the parallel lines for at least one of said mode of signals;
- transmission-line transformer circuit means connected to said parallel lines and responsive to energization in each of said modes for establishing between said parallel lines and said terminating means, a connecting circuit in response to energization by one of said mode of signals and an open circuit in response to energization by the other of said mode of signals.

4. The combination according to claim 3 above, wherein said means for terminating the parallel lines for at least one of said mode of signals includes means for sensing said signal.

5. In combination with two parallel lines which may be energized in common- or difference-mode to produce either common-mode signals or difference-mode signals on said lines, a terminal circuit comprising:
- a common-mode terminating means for terminating common-mode signals;
- a difference-mode terminating means for terminating difference-mode signals;
- transmission-line-transformer-circuit means connected to said parallel lines, responsive to common- and difference-mode signals for establishing a connecting circuit between said parallel lines and only said common-mode terminating means in response to common-mode signals and for establishing a connecting circuit between said parallel lines and only said difference-mode terminating means in response to difference-mode signals.

6. In combination with two parallel lines, which may be energized in common- or difference-mode to produce either common-mode signals or difference-mode signals on said lines, a terminal circuit comprising:
- means for terminating common-mode signals on parallel lines;
- means for terminating difference-mode signals on said parallel lines;
- transmission-line-transformer means connected to said parallel lines and across said common-mode terminating means, said transformer means responsive to difference-mode signals for shunting difference-mode signals around said common-mode terminating means, thereby terminating said parallel lines in said difference-mode terminating means; and
- means included in said transmission-line transformer-means responsive to common-mode signals for shunting common-mode signals around said difference-mode terminating means, thereby terminating said lines in said common-mode terminating means.

7. In combination with two parallel lines, which may be energized in common or difference-mode to produce either common-mode or difference-mode signals on said lines, a terminal circuit comprising:
- means for terminating common-mode signals on said parallel lines;
- means for terminating difference-mode signals on said parallel lines; and
- transmission-line-transformer means connected to said parallel lines and said common-mode and difference-mode terminating means in such a manner as to present an open circuit across one of said terminating means and a ground return for the mode of signals corresponding to said one of said terminating means and to present a short circuit across said one of said terminating means to direct the opposite mode of signals through the other of said terminating means.

8. In combination with two parallel lines which may be energized in common- or difference-mode to produce either common-mode signals or difference-mode signals on said line, a terminal circuit comprising:

a common-mode terminating means for terminating common-mode signals;

a difference-mode terminating means for terminating difference-mode signals, said difference-mode terminating means comprising a first transmission-line-transformer-circuit means, having an output which is terminated in an impedance, and an input;

a second transmission-line-transformer-circuit means connected to said parallel lines, responsive to common- and difference-mode signals for establishing a connecting circuit between said parallel lines and only said common-mode terminating means in response to common-mode signals, and for establishing a connecting circuit between said parallel lines and only the input of said first transmission-line-transformer-circuit means in response to difference-mode signals.

9. In combination with two parallel lines which may be energized in common- or difference-mode to produce either common-mode signals or difference-mode signals on said line, a terminal circuit comprising:

a common-mode terminating means for terminating common-mode signals;

a difference-mode terminating means for terminating difference-mode signals, said difference-mode terminating means comprising a first transmission-line-transformer-circuit means responsive to common- and different-mode signals for establishing a connecting circuit to ground in response to common-mode signals and for establishing a connecting circuit including impedance to ground in response to difference-mode signals;

a second transmission-line-transformer-circuit means connected to said parallel lines and to said difference-mode terminating means, responsive to common- and difference-mode signals for establishing a connecting circuit including said parallel lines, said common-mode terminating means, and said difference-mode terminating means, in response to common-mode signals, and for establishing a direct connecting circuit between said parallel lines and said difference-mode terminating means in response to difference-mode signals.

10. In combination with two parallel lines which may be energized in common- or difference-mode to produce either common-mode signals or difference-mode signals on said line, a terminal circuit comprising:

a common-mode terminating means connected to said lines for terminating common-mode signals;

a difference-mode terminating means connected to said parallel lines for terminating difference-mode signals, said difference-mode terminating means comprising impedance means and a first transmission-line-transformer-circuit means for establishing a connecting circuit between said parallel lines and only said impedance means in response to difference-mode signals; and a second transmission-line-transformer-circuit means connected to said parallel lines, responsive to common- and difference-mode signals for establishing a connecting circuit between said parallel lines and only said common-mode terminating means in response to common-mode signals.

11. In combination with two parallel lines which may be energized in common- or difference-mode to produce either common-mode signals or difference-mode signals on said lines, a terminal circuit comprising:

a first transmission-line transformer having first and second input terminals and first and second output terminals, said first input terminal connected to one of said parallel lines, and said first output terminal connected to the other of said parallel lines;

a first common-mode impedance bridging the first and second input terminals of said first transmission-line transformer;

a second common-mode impedance bridging the first and second output terminals of said first transmission-line transformer;

a second transmission-line transformer having first and second input terminals and first and second output terminals, said first input terminal connected to the second input terminal of said first transmission-line transformer, and said second input terminal connected to ground;

a delay circuit having first and second input terminals and corresponding first and second output terminals, the first output terminal of said delay circuit connected to the second output terminal of said second transmission-line transformer and the second output terminal connected to the first output terminal of said second transmission-line transformer, the first input terminal of said delay circuit connected to the second output terminal of said first transmission-line transformer, the second input terminal of said delay circuit connected to ground so that signals at the input of said delay circuit are delayed to the output of said second transmission-line transformer;

and a difference-mode impedance connected between ground and said second output terminal of said second transmission-line transformer.

12. The combination according to claim 11 above, wherein the difference-mode impedance includes means for sensing difference-mode signals.

13. In combination with two parallel lines which may be energized in common- or difference-mode to produce either common-mode signals or difference-mode signals on said lines, a terminal circuit comprising:

common-mode terminating means for terminating common-mode signals;

difference-mode terminating means for terminating difference-mode signals, said difference-mode terminating means comprising a first transmission-line-transformer-circuit means, having an input and an output;

a delay circuit having an output connected to the output of said first transformer, and an input;

a second transmission-line-transformer-circuit means connected to said parallel lines responsive to common- and difference-mode signals for establishing a connecting circuit between said parallel lines and only said common-mode terminating means in response to common-mode signals, and for establishing a connecting circuit between one of said parallel lines and only the input of said first transmission-line transformer and between the other one of said parallel lines and the input of said delay line in response to difference-mode signals.

14. The combination according to claim 13 above, wherein a sensing circuit is connected to the junction of said delay circuit and said second transmission-line transformer to thereby sense difference-mode signals passing therethrough.

15. In a two-core-per-bit memory, apparatus for sensing the current differential generated upon switching of corresponding A and B bit cores comprising:

a first terminal circuit for terminating common-mode and difference-mode signals generated by the A bit cores, including a difference-mode terminating impedance through which A bit core difference-mode signals flow;

a second terminal circuit for terminating common-mode and difference-mode signals generated by the B bit cores, including a difference-mode terminating impedance through which B bit core difference-mode signals flow; and a sense amplifier common to said first and second terminal circuits connected to said difference-mode terminating impedance such that difference-mode signals of both A and B bit cores flow through said sense amplifier.

References Cited by the Examiner

UNITED STATES PATENTS 3,231,753 1/1966 Brown -------------- 340—174

BERNARD KONICK, *Primary Examiner.*

S. URYNOWICZ, *Assistant Examiner.*